Patented Aug. 3, 1943

2,325,726

UNITED STATES PATENT OFFICE 2,325,726

CALKING COMPOUND

Harold L. Acker, Hollywood, Calif., assignor to W. P. Fuller & Co., San Francisco, Calif., a corporation of California No Drawing. Application October 9, 1940,
Serial No. 360,446

5 Claims. (Cl. 260—40)

This invention relates to compositions of matter suitable for use as calking compounds, filleting and packing materials. It relates more particularly to a permanently plastic, non-hygroscopic, non-shrinking sealing compound which is not affected by petroleum hydrocarbons, alcohols, oils or water. It further relates to plastic compositions of this type which contain zinc chromate and which are particularly useful in calking and sealing seams and joints in airplanes, fuel tanks, etc.; also to the use of reacting agents such as zinc oxide when an insoluble mass is desired after the application process, to obtain the same ultimate results as obtained with asbestos fibres or other extenders and without the aid of solvents.

These compositions have excellent insulating properties against chemical, mechanical and electrical corrosion.

In the past, various materials have been used in airplane construction for calking joints, etc., among which are various synthetic rubber compositions and phenol-aldehyde condensation products. For varying reasons these have not proved entirely satisfactory. Some of them become brittle on ageing, whereas others have a tendency to shrink. Others swell under the action of solvents and then shrink when the solvent evaporates. All of these disadvantages prevent the manufacture of permanently tight joints such as are required in gasoline tanks, airplane cabins, pontoons, etc. The calking compounds used heretofore have generally been applied to strips of paper or cloth which were then placed in the seams prior to riveting.

It has now been found that when certain alkyd resins of the soft, rubbery type are combined with varying amounts of zinc chromate, with or without other fillers, diluents, solvents, etc., calking compounds are obtained which have outstanding properties and which eliminate the difficulties enumerated above, particularly for use in the construction of airplanes. The compounded resins can be used in combination with synthetic plastic sheet material such as vinyl chloride for such purposes as require a sealing medium in the form of a tape.

The alkyd resins having the rubbery properties which make them suitable for the purposes of the present invention are prepared by condensing a polyhydric alcohol, such as the glycols, glycerine and polyglycerines, with an aliphatic polybasic acid containing six or more carbon atoms, such as adipic, suberic, sebacic, and higher dibasic acids. Mixtures of alcohols and mixtures of acids may be employed to vary the consistency of the final resin as desired. In case somewhat harder resins are desired for some purposes, part of the dibasic acid may be replaced by phthalic acid or an aliphatic bibasic acid containing fewer carbon atoms, such as maleic, malonic or succinic acid. Fatty acirs, especially those of the non-drying oils, may also be used in place of part of the dibasic acid.

The alkyd resins obtained from the foregoing materials are of the so-called non-drying type; that is, they do not oxidize to hard films on exposure to the air but retain their plastic properties over considerable periods of time. For the reason that they are permanently plastic, these resins, when combined with zinc chromate, form excellent calking compounds which can be used in calking metal-metal joints or seams in wooden structures such as tanks, ship hulls, etc. They are all insoluble in aliphatic hydrocarbons, alcohols, and water and hence can be employed in calking the seams of fuel tanks for airplanes and other motor vehicles. Owing to the fact that the cold flow of such compositions is practically nil, they are eminently suitable for calking the seams and joints which are subjected to gas or liquid pressure. Thus, they can be used in the seams and joints of the wings and fuselages of airplanes designed to fly in the stratosphere while maintaining approximately normal atmospheric pressure within the cabin. In joints and seams of this type it is not necessary to employ a fabric such as canton flannel or paper, etc., to reinforce the calking compound and prevent its flowing out of the seam under the prevailing pressure.

For many purposes it is desirable to modify the properties of the alkyd resin by mixing therewith other organic plastics. Suitable modifying agents of this type are inorganic and organic esters of cellulose such as the nitrate, acetate, propionate, acetobutyrate, acetopropionate, etc., cellulose ethers such as ethyl or benzyl cellulose, chlorinated rubber, polychloroprene, polyvinylacetate, polyacrylic compounds, polystyrene, phenol-aldehyde resins, etc. The cellulose derivatives increase the resistance of the calking compound to the action of aromatic hydrocarbons. The proportion of alkyd resin to modifying agent may vary from 1:1 to 4:1. Plasticizers, such as the phthalic acid esters of monohydric alcohols, may be incorporated.

In addition to the zinc chromate other inorganic fillers and extenders may be incorporated. Ground mica and magnesium silicates are suitable. In order to increase the cohesion in the body of the calking compound it is often desirable to incorporate long fiber asbestos. Such compositions are advantageously used in joints and seams which may be subjected to high pressures from gas or liquid. The proportion of asbestos fiber used may be from 25 to about 100% of the weight of the inorganic material present in the compound.

The zinc chromate and other solid admixtures may be incorporated with the alkyd resin in any desired manner, for example, on a rubber mill or in a mixer of the Werner and Pfleiderer type. In many cases the use of a small amount of solvent for the alkyd resin facilitates the incorporation of the filler, etc. Suitable solvents are esters and ketones such as butyl or ethyl acetate, acetone, methylethyl ketone, etc.

The calking compounds prepared from these resins and zinc chromate in the absence of solvents do not shrink after application since they are unaffected by the oxygen of the atmosphere. When a solvent is employed to facilitate preparation or application it should be evaporated before the joint is finally made so as to avoid shrinkage.

The compounds prepared according to the foregoing description may be reduced to spraying or brushing consistency by means of suitable solvents and employed as a coating for the interior of gasoline or oil storage tanks.

Specific examples of methods of making the calking compound both with and without solvent and specific illustrations of the manner in which they are used are given as follows:

*Example 1.*—600 pounds of glyceryl sebacate resin is heated to 150° F. and placed in a Ross Pony mixer, or Werner and Pfleiderer mixer. On mixing add 10 pounds zinc chromate and 300 pounds asbestos fibre and mix until a homogenous mass is obtained. The resulting product is suitable for fillets, packing, or calking, or for any purpose requiring a plastic which is aliphatic hydrocarbon, alcohol, or water resistant. This plastic combination has excellent insulating properties against chemical, mechanical, or electrical corrosion. The product has excellent cohesion and also good adhesion.

*Example 2.*—800 pounds glyceryl sebacate resin is heated to 150° F. and placed in a Ross Pony mixer, or a Werner and Pfleiderer mixer. On mixing add 10 pounds zinc chromate pigment and 400 pounds of 1000 mesh mica and mix until a homogenous mass is obtained. The resulting product is suitable for fillets, packing, or calking; i. e., aircraft windshields, aircraft landing lights, or for any purpose not subject to withstand pressure, but which requires a plastic non-drying and non-shrinking material. This product has excellent adhesion, but has a low factor of cohesion.

*Example 3.*—400 pounds glyceryl sebacate resin and 400 pounds of a solvent such as ethyl acetate is mixed in a Ross Pony mixer until a homogenous mass is obtained. To this is added 10 pounds of zinc chromate pigment and 200 pounds of asbestos fibre, which is agitated until well mixed. This mixture is then dispersed on a three roller Lehman mill to a homogenous mass. The resulting product is used as a seal between metal to metal seams. It is applied with a pressure applicator in the form of a ribbon about $\frac{1}{32}$ inch thick and in any width as required for the particular assembly. The ribbon must be allowed to dry about 30 minutes before the riveting operation. The product is suitable for sealing gasoline tanks, pontoons, floats, floatation compartments, flying boat hulls, etc.; also, for the insulation of dissimilar metals against corrosion.

*Example 4.*—350 pounds glyceryl sebacate resin and 350 pounds of a solvent such as ethyl acetate is mixed in a Ross Pony mixer until a homogenous mass is obtained. To this is added 10 pounds zinc chromate pigment, 200 pounds of 1000 mesh mica and 200 pounds of 3000 mesh asbestos fibre, which is agitated until well mixed. This mixture is then dispersed on a three roller Lehman mill to a homogenous mass. The resulting product is used for brushing purposes as an insulating medium between dissimilar metals.

*Example 5.*—400 pounds glyceryl sebacate resin and 400 pounds of solvent such as ethyl acetate is mixed in a Ross pony mixer until a homogenous mass is obtained. To this is added 10 pounds zinc chromate pigment, 200 pounds of 3000 mesh asbestos fibre, and 200 pounds of 1000 mesh mica and 200 pounds of long fibre asbestos, which is agitated until well mixed, and is then dispersed on a three roll Lehman mill to a homogenous mass. The resulting product is used as a seal between metal to metal seams that are subjected to high pressure, as stratosphere cabins; or to heat, as integral oil tanks. This type of mixture has the least cold flow characteristics of all of the types. The compounded mixture is applied with a pressure applicator in the form of a ribbon about $\frac{1}{32}$ inch thick and in such width as required by the particular assembly. Allow about 30 minutes drying time before riveting any assembly.

It will be noted that in the above examples, the resin and the inert filler, such as asbestos fibre or mica, form the major ingredients of the compound and are mixed in fairly definite proportions ranging from 600:300 pounds in Example 1; 800:400 pounds in Example 2; 400:200 pounds in Example 3; 350:400 pounds in Example 4, and 400:600 pounds in Example 5. In the first three examples the ratio is 2:1; in the fourth, substantially 7:8, and in the fifth, 1:1½. From the examples the general rule may be established that the two main ingredients should be mixed within the range limited by the extremes of two pounds of resin to one pound of filler and one pound of resin to one and one-half pounds of filler.

It will be further noted that the total number of pounds of both constituents in the first example is 900 pounds, in the second example 1200 pounds, in the third, 600 pounds, in the fourth, 750 pounds, and in the fifth, 1000 pounds. The amount of zinc chromate used in each example is 10 pounds, which is approximately .83% of the largest amount and 1.64% of the smallest amount. This establishes the general rule that the proportion of zinc chromate used should be approximately between .83 and 1.64% of the total weight of the main constituents.

*Example 6.*—150 pounds glyceryl sebacate resin and 150 pounds of solvent such as ethyl acetate is mixed to a homogenous mass in a Ross pony mixer. To this is added 10 pounds zinc chromate pigment, 100 pounds of 30 centipoise nitrocellulose and 400 pounds ethyl acetate which is mixed to a homogenous mass. The resulting product is suitable for interior surfaces of gasoline tanks (aluminum, steel, etc). as a corrosion resisting coating. The product has excellent insulating qualities for use between dissimilar metals. It is suitable for use as an organic coating which is subjected to submersion, hydrocarbons, alcohols, or water. The product is applied by spraying, brushing, dipping, or slushing.

Soft alkyd resins suitable for use in making the calking compounds described herein may be made according to the Bruson U. S. Patent 1,779,367.

I claim:

1. A calking composition comprising a mixture of approximately 600 pounds of an unmodified hydrocarbon-insoluble alkyd resin derived from a polyhydric alcohol and an aliphatic di-carboxylic acid containing at least six carbon atoms, 10 pounds of zinc chromate and 300 pounds of asbestos fibre.

2. A calking compound of the character described, comprising a mixture of approximately 400 pounds of an unmodified hydrocarbon-insoluble alkyd resin derived from a polyhydric alcohol and an aliphatic di-carboxylic acid containing at least six carbon atoms, 10 pounds of zinc chromate, 200 pounds of inert filler selected from a group consisting of asbestos fibre and ground mica and 400 pounds of a volatile solvent for the resin.

3. A permanently plastic, non-shrinking, non-hygroscopic calking compound comprising a mixture containing an unmodified hydrocarbon-insoluble alkyd resin derived from a polyhydric alcohol and an aliphatic di-carboxylic acid containing at least six carbon atoms and an inert filler selected from a group consisting of asbestos fibre and ground mica as major constituents, the latter being mixed in proportions substantially within the limits of two pounds of resin to one pound of filler and one pound of resin to one and one-half pounds of filler, and zinc chromate in the proportion of approximately .83 to 1.64% by weight of the entire mixture, the resin, the filler and the zinc chromate being mixed to form a homogeneous mass.

4. A permanently plastic, non-shrinking, non-hygroscopic calking compound comprising a mixture containing an unmodified, hydrocarbon-insoluble alkyd resin derived from a polyhydric alcohol and aliphatic di-carboxylic acid containing at least six carbon atoms and an inert filler selected from a group consisting of asbestos fiber and ground mica as major consttiuents, the latter being mixed in proportions substantially within the limits of two pounds of resin to one pound of filler and one pound of resin to one and one-half pounds of filler, zinc chromate in the proportion of approximately .83 to 1.64% by weight of the said mixture, the resin, the filler and the zinc chromate being mixed to form a homogeneous mass, and a volatile solvent for the resin substantially equal in weight to the latter.

5. A calking compound comprising a mixture of approximately 600 pounds of an unmodified, hydrocarbon-insoluble glyceryl sebacate resin, ten pounds of zinc chromate and three hundred pounds of asbestos fibre.

HAROLD L. ACKER.